US012639765B2

(12) United States Patent
Wolf et al.

(10) Patent No.: US 12,639,765 B2
(45) Date of Patent: **\*May 26, 2026**

(54) SELECTIVE SUPPRESSION OF IMPLIED CONTRACT GENERATION

(71) Applicant: Chicago Mercantile Exchange Inc., Chicago, IL (US)

(72) Inventors: Brian M. Wolf, Roselle, IL (US); John F. Curran, Chicago, IL (US); James W. Farrell, Wheaton, IL (US); Paul J. Callaway, Chicago, IL (US); Barry Galster, Chicago, IL (US); Andrew Milne, Maplewood, NJ (US); Giuseppe Scimeca, Chicago, IL (US); Pearce Peck-Walden, Chicago, IL (US); James Wilcox, Chicago, IL (US)

(73) Assignee: Chicago Mercantile Exchange Inc., Chicago, IL (US)

( \* ) Notice: Subject to any disclaimer, the term of this patent is extended or adjusted under 35 U.S.C. 154(b) by 70 days.

This patent is subject to a terminal disclaimer.

(21) Appl. No.: 17/986,109

(22) Filed: Nov. 14, 2022

(65) Prior Publication Data

US 2023/0072217 A1      Mar. 9, 2023

Related U.S. Application Data

(63) Continuation of application No. 16/241,403, filed on Jan. 7, 2019, now Pat. No. 11,526,939, which is a continuation of application No. 13/534,416, filed on Jun. 27, 2012, now Pat. No. 10,204,377.

(60) Provisional application No. 61/522,556, filed on Aug. 11, 2011.

(51) Int. Cl.
*G06Q 40/04* (2012.01)

(52) U.S. Cl.
CPC ......... *G06Q 40/045* (2025.08); *G06Q 40/043* (2025.08)

(58) Field of Classification Search
CPC ..................... G06Q 40/04; G06Q 40/043–045
See application file for complete search history.

(56) References Cited

U.S. PATENT DOCUMENTS

| | | | |
|---|---|---|---|
| 7,039,610 B2 | 5/2006 | Morano et al. | |
| 7,260,554 B2 | 8/2007 | Morano et al. | |
| 7,548,882 B1 * | 6/2009 | Pazner ................... | G06Q 40/04 |
| | | | 705/37 |

(Continued)

OTHER PUBLICATIONS

"Implied Price Functionality Overview", CME Group, 2007. (Year: 2007).*

(Continued)

*Primary Examiner* — Eric T Wong
(74) *Attorney, Agent, or Firm* — Lempia Summerfield Katz LLC

(57) ABSTRACT

An electronic trading system utilizes a Match Engine that receives orders, stores them internally, calculates tradable combinations and advertises the availability of real and implied orders in the form of market data. New tradable items defined as combinations of other tradable items may be included in the calculation of tradable combinations. A technique is disclosed for suppression of the calculation and/or subsequent listing of an implied order when the order is either undesired or unnecessary in the market therefore.

20 Claims, 6 Drawing Sheets

(56)                    References Cited

U.S. PATENT DOCUMENTS

| | | | | |
|---|---|---|---|---|
| 7,805,360 | B2 | 9/2010 | Sundaram et al. | |
| 7,809,631 | B2 | 10/2010 | Bauerschmidt et al. | |
| 8,433,640 | B2* | 4/2013 | Rooney | G06Q 40/04 |
| | | | | 705/37 |
| 10,204,377 | B2* | 2/2019 | Wolf | G06Q 40/04 |
| 11,526,939 | B2* | 12/2022 | Wolf | G06Q 40/04 |
| 2003/0069830 | A1* | 4/2003 | Morano | G06Q 40/04 |
| | | | | 705/37 |
| 2005/0203826 | A1* | 9/2005 | Farrell | G06Q 40/06 |
| | | | | 705/37 |
| 2010/0017321 | A1* | 1/2010 | Callaway | G06Q 40/04 |
| | | | | 705/37 |
| 2010/0174633 | A1* | 7/2010 | Milne | G06Q 40/06 |
| | | | | 705/37 |
| 2010/0318459 | A1 | 12/2010 | Sundaram et al. | |
| 2011/0055067 | A1 | 3/2011 | Milne et al. | |
| 2011/0066536 | A1 | 3/2011 | Milne | |
| 2011/0066537 | A1* | 3/2011 | Milne | G06Q 40/04 |
| | | | | 705/37 |
| 2011/0066567 | A1 | 3/2011 | Acuna-Rohter et al. | |
| 2011/0066568 | A1 | 3/2011 | Milne et al. | |
| 2011/0313905 | A1* | 12/2011 | Siddall | G06Q 40/04 |
| | | | | 705/37 |
| 2011/0320334 | A1* | 12/2011 | Mintz | G06Q 30/06 |
| | | | | 705/37 |

OTHER PUBLICATIONS

"Implied Price Functionality Overview", CME Group, 2007.
Extended European Search Report in European Patent Application No. 12822710, dated Mar. 3, 2015, 8 pages.
International Preliminary Report on Patentability in International Application No. PCT/US2012/044307, dated Feb. 11, 2014, 7 pages.
International Search Report and Written Opinion in International Application No. PCT/US2012/044307, dated Aug. 16, 2012, 10 pages.

* cited by examiner

400

Processor
402

Instructions
412

Memory
404

Instructions
412

Drive Unit
406

Computer
Readable Medium
410

Instructions
412

408

Display
414

User Input Device
416

Communication
Interface
418

Network
420

SELECTIVE SUPPRESSION OF IMPLIED CONTRACT GENERATION

REFERENCE TO RELATED APPLICATIONS

This application is a continuation under 37 C.F.R. § 1.53(b) of U.S. patent application Ser. No. 16/241,403 filed Jan. 7, 2019, now U.S. Pat. No. 11,526,939, which claims priority to, and the benefit as a continuation under 37 C.F.R. § 1.53(b) of U.S. patent application Ser. No. 13/534,416 filed Jun. 27, 2012, now U.S. Pat. No. 10,204,377, which claims the benefit of the filing date under 35 U.S.C. § 119(e) of U.S. Provisional Application Ser. No. 61/522,556 filed Aug. 11, 2011, the entirety of all of which is are hereby incorporated by reference.

TECHNICAL FIELD

The following disclosure relates to software, systems, and methods for electronic trading in a commodities exchange, derivatives exchange or similar business involving tradable items where orders from buyers are matched with orders from sellers.

BACKGROUND

Electronic trading systems allow entry of a bid or offer for a particular tradable item, which in futures trading is referred to as a contract. The simplest possible futures contract is the outright contract defined by a product and a delivery period. It is also possible to define combination contracts, such as a spread contract, which is defined as the simultaneous purchase and sale of two or more tradable items, such as futures contracts for different months, different commodities, or different grades of the same commodity. The bid and offer components of a spread are termed the bid leg and the offer leg respectively.

Electronic trading systems accept bids and offers, whether for outright contracts or spreads, in the form of orders, also referred to as real orders because they consist of data entered by traders either directly or by computing devices under their control. An order for an outright contract may be referred to as an "outright order" or simply as an "outright." Real orders may be entered for any tradable item in the system including, but not limited to, futures, options, inter-commodity spreads, intra-commodity spreads, futures strips, calendar spreads, butterfly spreads, condor spreads, crack spreads, straddles, and strangles.

Implied orders, unlike real orders, are generated by the system on the behalf of traders who have entered real orders, generally with the purpose of increasing overall market liquidity. For example, an implied spread order may be derived from two real outright orders. Trading systems identify and create, i.e., calculate, the "derived" or "implied" order and display the market that results from the creation of the implied order as a market that may be traded against. If a trader enters an order to trade against this implied market, then the newly entered order and the real orders that were used to derive the implied market are executed as matched trades.

Implied orders frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied orders at better prices will encourage traders to enter the opposing orders to trade with them. The more combinations that the Match Engine of a trading system can calculate, the greater this encouragement will be and the more the exchange will benefit from increased transaction volume.

Generating an implied market is a complex process because of, among other considerations, the large number of potential order combinations upon which implied orders may be based. For example, a single commodity product available in 72 different delivery months will have 72 possible outright contracts, each of which may have a resting buy order or a resting sell order. There are 2556 ($=(72*71)/2$) potential spread contracts, noting that the buy/sell combination and sell/buy combination of any two outright contracts both correspond to the same spread contract. For a simple implied where two real orders combine to form a third order, there are 5256 ($=2*72+2*2556$) choices of the order to imply and 71 ($=72-1$) ways to choose a combination of two orders implying any given third order, leading to 373,156 combinations overall. As the number and complexity of the contracts involved in implication gets larger, the number of possible combinations grows exponentially.

For these reasons, trading systems that derive implied orders are often limited by computing capacity and speed. Conventional trading systems do not have an efficient method of determining all possible or best possible implied markets, especially when the order combinations involve more than a few orders.

DETAILED DESCRIPTION

The disclosed embodiments relate to suppression of the calculation and/or subsequent listing of an implied order when the order is either undesired or unnecessary in the market for that order.

The order matching function in an electronic trading system is typically performed by a specialized component referred to as a Match Engine, of which there may be multiple instances. Each Match Engine is a specialized order matching component that receives orders, stores them internally, calculates tradable combinations and advertises the availability of real and implied orders in the form of market data. Traders, in turn, utilize the trading system to respond to the market data by sending additional orders. These additional orders are received by the Match Engine, which then attempts to match them with previously received orders or combinations thereof. The Match Engine executes the possible trades and communicates the results.

The embodiments are illustrated and described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved are readily extended to other protocols and interfaces in a predictable fashion.

Regulated and unregulated exchanges and other electronic trading services make use of electronic trading systems. For example, the following embodiments are applicable to any trading or futures market in the United States or elsewhere in the world, for example, the Chicago Board of Trade (CBOT), the Chicago Mercantile Exchange (CME), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

Figure 1:
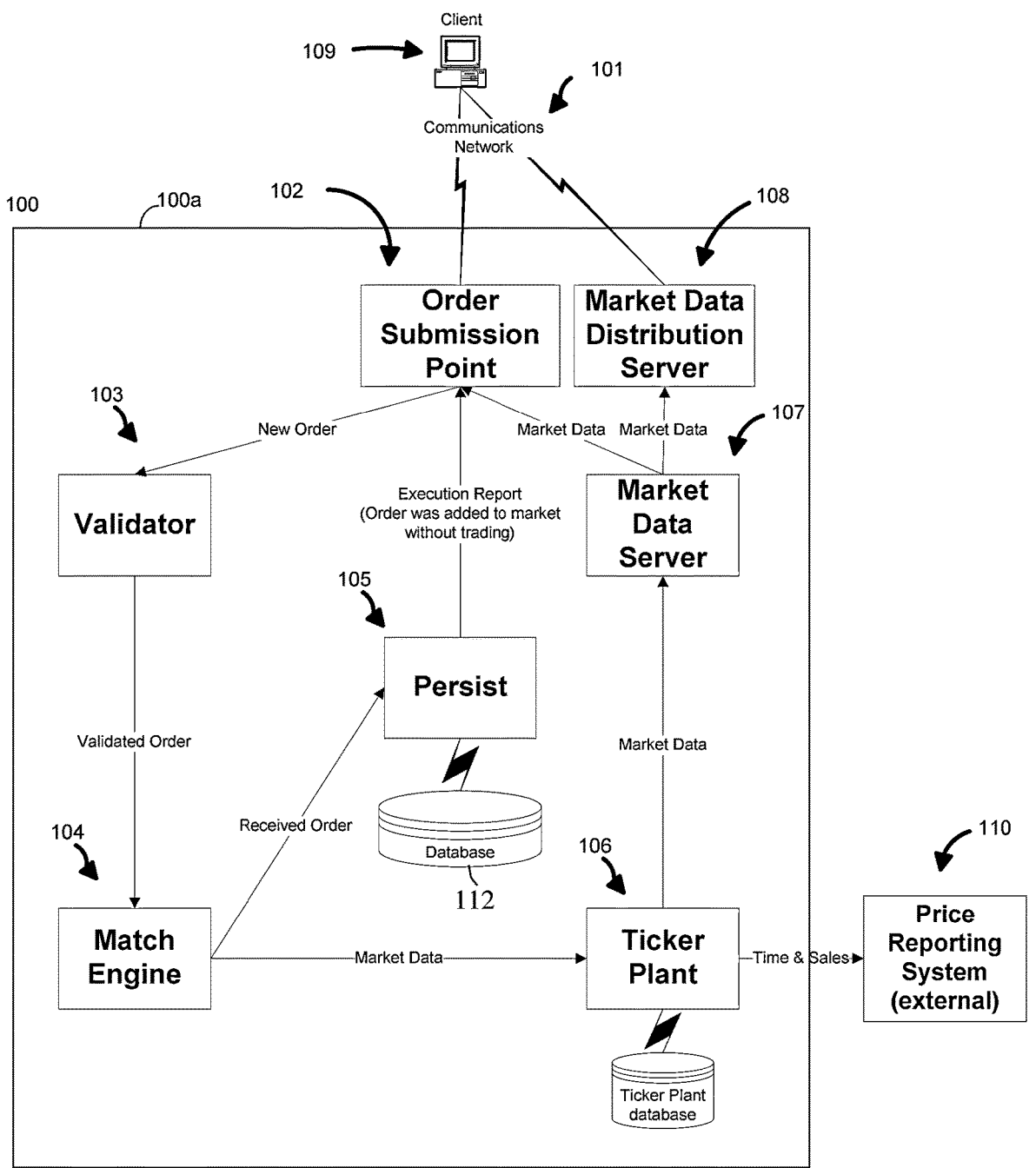
FIG. 1 illustrates an exemplary electronic trading system.

An example of the functional layout of such an electronic trading system 100 is shown in FIG. 1. In this example, the electronic trading system 100 includes the components shown within the system boundary 100*a*. The client 109 and the price reporting system 110 are shown outside the system boundary 100*a* but communicate with the electronic trading system 100 using a wired and/or wireless, proprietary and/or non-proprietary communications network 101, such as the Internet, and may include the network 420 described below with respect to FIG. 4. The term client is used generically to indicate any user operated device or other networked device capable of communicating with the electronic trading system 100. The electronic trading system 100, as well as each client, may be implemented as a computer 400 as described below with respect to FIG. 4.

In an exemplary implementation, the client 109 transmits electronic orders to an Order Submission Point 102 by way of the communication network 101, such as the Internet. It is contemplated that Order Submission Points 102 may take on a wide variety of application-specific designs to suit the needs of particular brokerages, investors, investment plans and the like. It is also contemplated that the electronic trading system 100 may contain multiple Validators 103, Match Engines 104, Persist components 105, Ticker Plants 106, Market Data Servers 107 and Market Data Distribution Servers 108. The routing of messages between these components 103 to 108 may be managed with commercially available hardware and software. It is understood that descriptions are given in the singular only to simplify the exposition. It is further understood that the term "order" and "new order" may also refer to any data communicated to the trading system that can affect the properties of a previously communicated order, including, but not limited to, modification of its price, modification of its volume or its cancellation or replacement by a different order, or a combination thereof.

The Order Submission Point 102 communicates with the Validator 103. The Validator 103 checks the properties of the new order against established criteria and communicates the validated order to the relevant Match Engine 104, if more than one is provided (not shown). In FIG. 1, it is assumed that the new order did not match any previously entered orders, so the Match Engine 104 communicates the unmatched received order to the Persist component 105, which stores the order, sometimes referred to as a "resting order," in its database 112, the accumulation of related orders in this database 112 sometimes being referred to as an "order book" or a "market." In FIG. 1, it is also assumed that the storage of the order by the Persist component 105 constitutes its "official" reception by the trading system, so the Persist component 105 communicates an execution report to the Order Submission Point 102, from which it is communicated to the originator of the order. The Persist component 105 may be implemented as part (such as software or firmware) of the match engine 104. Alternatively, the Persist component 105 may be a database, a memory, or another storage element, such as the memory 404 described with respect to FIG. 4. Additionally, the Persist component 105 may be computer hardware including a processor and a storage element, such as the processor 402 and memory 404 described below with respect to FIG. 4.

The Match Engine 104 also communicates the existence of the new order and any implied orders that it created, described in more detail below, to the Ticker Plant 106 (reporting device) which in turn, communicates the new order and implied orders to the Market Data Server 107. The Ticker Plant 106 (reporting device) occupies this position between the Match Engine 104 and the Market Data Server 107 and functions to aggregate data from multiple sources and communicate with components outside the electronic trading system 100, such as the Price Reporting System 110. The Ticker Plant 106 (reporting device) may be implemented as an integrated component of the Match Engine 104. Alternatively, the Ticker Plant 106 may be computer software, firmware, or hardware, that is separate but in communication with the Match Engine 104 (as shown). The Ticker plant 106 may store all or part of the data it receives in a Ticker Plant Database coupled therewith. The Market Data Server 107 may communicate market data to the client 109 in a variety of ways. For example, the market data may be sent to the Order Submission Point 102 for communication with the client over the same link as the execution report, or sent to a Market Data Distribution Server 108 that can communicate with any number of clients (not shown).

Those of skill in the art will appreciate that the operations of the Match Engine 104 may be performed in more than one part of trading system 100 or in related systems. For example, the calculation of implied orders may be done by traders at their trading stations (not shown) in search of arbitrage opportunities between trading networks or match engines. It is also possible to perform these calculations outside the trading system 100 for the evaluation of possible trading strategies, for instruction, regulation or in the solution of other problems where trading is used as a model.

Figure 2:
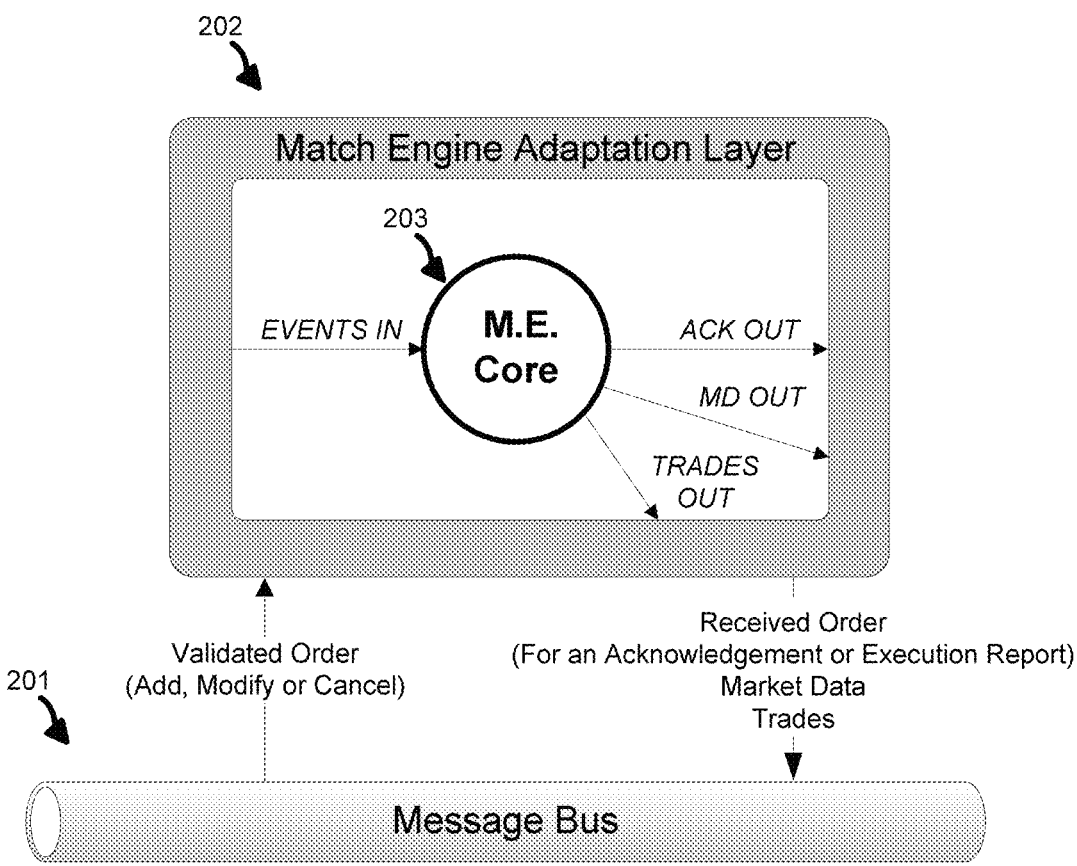
FIG. 2 illustrates an exemplary match engine architecture according to one embodiment.

FIG. 2 shows a more detailed block diagram of the Match Engine 104 of FIG. 1 having a layered architecture and embodied on a computer including a processor and a memory, such as the compute 400 having a processor 402 and memory 404, as described below with respect to FIG. 4. The Match Engine 104 may communicate with other components using a message bus 201. Incoming messages are translated by an Adaptation Layer 202 into events that can be processed by a Match Engine Core 203, sometimes referred to simply as the Core 203. The output messages from the Core 203 are translated by the Adaptation Layer 202 back into messages that can be transmitted to other parts of the trading system 100 using the message bus 201. The Core 203 calculates implied orders and may be implemented in hardware, software or a combination thereof. In one embodiment, the Core 203 is implemented in software which is referred to as the Implicator or Match Engine Implicator (not shown). Although this example includes the Implicator as part of Match Engine 104 in an electronic trading system 100, the Implicator can be used in any system where implied orders need to be calculated. An example of such a system is the client software used by a trader to receive market data and search for arbitrage opportunities on multiple electronic trading systems.

A Match Engine Core 203 and its Implicator may be implemented in a programming language such as Java or C++ that allows multiple threads of execution and that a program with multiple threads may be executed on a computing system with multiple central processing units (CPU). In such an implementation, if the program is correctly designed, the threads may execute substantially in parallel and the time taken to execute all of the threads can be as short as the time taken by the single longest thread. If there are more threads than CPUs, then the execution time will depend on how many threads must be executed sequentially on each CPU. In FIG. 2, it is contemplated that the Core 203 will be implemented in such a language and that the calculation of implied orders by the Implicator will be accelerated by performing many independent calculations in parallel on separate threads.

An Implicator operates on a group of contracts referred to as an implication group. In futures trading, an implication group consists of orders for outright contracts and combination contracts that can trade with each other. An outright contract is defined by at least a product and a delivery period, such as West Texas Intermediate Crude Oil delivered at Cushing, Oklahoma in the month of January 2008. A combination contract, also referred to as a strategy, may be defined as a combination of orders for outright contracts where each order for an outright contract forms a leg of the strategy. The definition specifies whether buying a unit quantity of the strategy, i.e. the combination contract, requires a given leg to be bought or sold and in what quantity. Strategies may be defined by the exchange and advertised to traders as tradable instruments. Strategies may also be defined by users through a security definition request conveyed to the trading system using an appropriate protocol, as will be described in more detail below.

A simple combination contract found in many futures trading systems is the calendar spread, which is a contract to buy a product in one delivery period and sell it in another. An exemplary implication group would be the outright contracts for a given product in two different delivery periods and the calendar spread contract between these two outright contracts.

It is possible to define combination contracts with any number of legs. Further examples of combination contracts include the intercommodity spread with two legs, the 3:2:1 ratio spread with three legs and the yearly strip with twelve legs. Any number of such contracts may be placed in an implication group so long as any combination contract that belongs to the group also has all of its outright leg contracts as members of the group. It is not necessary for every possible combination of the outright contracts to correspond to a tradable combination contract.

It is possible to define combination contracts where the purchase of a single unit of the combination requires the purchase or sale of any number of units in the legs. The number of units required of any given leg is referred to as its volume ratio. Examples of strategies that include legs having different volume ratios include, but are not limited to, the butterfly, the double butterfly, crack spreads, crush spreads, and other ratio spreads, which are discussed in detail below.

It is possible to extend the foregoing definitions to tradable items other than commodity futures, such as equities, options on equities, options on futures and other tradable instruments.

An exemplary combination contract is the butterfly, which consists of three legs referred to as the wing, the body and the (second) wing. A futures butterfly is typically defined with the wing, the body and the second wing in three successive delivery periods. A futures butterfly definition may be expressed using trading terminology as Buy1exp1 Sell2exp2 Buy1exp3. The double position in the middle is called the body, while the two other positions are called the wings.

The options butterfly, which is a often used as an example because of its common use in volatility trading, is defined with the wing, the body and the second wing as options in the same product and delivery period but with different strike prices. The buy butterfly (long butterfly) call options spread includes a long call at a low strike price, (a long 1 call at (X–a) strike), a long call at a high strike price (long 1 call at (X+a) strike), and a short with twice the unit volume at the average strike price (short 2 calls at X strike). Buy butterfly spreads may also be formed with put options and may also be unbalanced, using different strike prices. A sell butterfly (short butterfly) takes the opposite position.

The double butterfly, also known as the double butterfly spread, is a combination defined as a spread between two simple butterflies, i.e. one butterfly is bought and the other sold. A double butterfly futures spread may be equally defined as a combination of legs at four different delivery periods (expiry dates), which may be expressed as "buy1exp1 sell3exp2 buy3exp3 sell1exp4". For a double butterfly options spread the legs are at four different strike prices instead of different delivery periods.

The crack spread involves a ratio of crude oil to a distillate such as gasoline or heating oil. Simple crack spreads involve only crude oil and a single distillate. However, crack spreads may also be defined in two-one-one, three-two-one, or five-three-two ratios of crude oil and two of its distillates.

A crush spread involves soybeans or other commodity and the products that can be made from the commodity, such as oil from soybeans. A crush spread may be made at any ratio.

The crack spread and crush spread are specific examples of ratio spreads. A ratio spread is any strategy that involves buying some number of tradable instruments and selling a different number of other tradable instruments. The tradable instruments may have some common property and the ratio may be based on some relationship between the physical or financial products that the tradable instruments represent, but this is not required. For example, a ratio spread can be formed using options of the same underlying market (or another market) and (usually) the same expiration date, but of a different strike price. However, this is just an example and ratio spreads may in principle be constructed with any combination of contracts and volume ratios in any number of buy and sell legs.

The disclosed embodiments may further be applicable to currency spreads, also referred to as currency swaps or foreign exchange swaps, where orders for such swaps may result in implied orders as described herein. For example, an order for a dollar-yen swap and a Franc-Euro swap may imply an order for a dollar-Euro swap.

An example of a technique for defining implicable contracts and calculating the implied orders that can trade in such contracts can be found in U.S. patent application Ser. No. 12/032,379, entitled "Symbolic Language For Trade Matching" and published as US Patent Application Publication No. 2009/0327153 A1, which is incorporated herein by reference in its entirety. The match engine modeling language (MEML) and implication techniques described therein make use of graph theory, which is the study of mathematical structures used to model pairwise relations between objects from a certain collection. A "graph" in this context refers to a collection of vertices or "nodes" and a collection of "edges" that connect pairs of vertices. The type of graph used in the technique is sometimes referred to more specifically as a "directed graph," since each edge is defined with a source node and a target node, and is directed from the source to the target.

In one implementation, the Match Engine 104 is a computing device operating under the control of a computer program, wherein the computer program implements a specification expressed in the match engine modeling language. As contemplated by U.S. patent application Ser. No. 12/032,379, the modeling language includes a concrete syntax, an abstract syntax for constructing expressions in the language, a syntactic mapping for associating MEML expressions with elements of the trading system 100 and a semantic mapping to relate modeling language expressions to real-world business requirements.

An example of a technique for rapidly calculating implied orders is given in U.S. patent application Ser. No. 12/350, 788, entitled "Determination of Implied Orders in a Trade Matching System" and published as US Patent Application Publication No. 2010/0174633 A1, which is incorporated herein in its entirety. A match engine that implements a specification expressed in the match engine modeling language contemplated by U.S. patent application Ser. No. 12/032,379 may have its speed of calculation increased thereby.

Those of skill in the art will appreciate that once a method has been given for expressing a tradable combination of contracts in the match engine modeling language contemplated by U.S. patent application Ser. No. 12/032,379, a match engine specified in that modeling language can be readily extended to perform the computations required to imply any component order in that combination using the techniques associated with finding shortest paths in a graph.

Methods used to accelerate the calculation of implied orders, such as the categorization, analysis, allocation, filtering, thread management and merging techniques contemplated by U.S. patent application Ser. No. 12/350,788 do not depend on the specific form of shortest path calculation so long as there is a means of assigning shortest path trees or similar groups of data to independent threads.

There may be many well-known methods available for calculating shortest paths including, without limitation: Floyd's algorithm, the Bellman-Ford algorithm, Dijkstra's algorithm and Johnson's algorithm. Similarly, the calculation of other graph properties, including but not limited to the identification and removal of zero-priced or negatively-priced cycles within a graph can be performed using straightforward extensions of these algorithms or with other known algorithms.

The disclosed embodiments will be described in application to a calendar spread, also referred to as an inter-delivery, intra-market, time or horizontal spread, which, generally, is an options or futures spread established by simultaneously entering into a long and short position on the same underlying asset but with different delivery months. Calendar spreads generally include a combination of front month and back month contracts. Generally, a "front month" contract refers to a contract having an expiration date closest to the current date, often in the same month, and is typically the shortest duration contract that may be purchased in the futures market. A "back month" contract refers to a contract which expires in any month past the "front month" contract expiration. Front month contracts are generally the most "liquid" of futures contracts, i.e., it is most easily traded without large transactions affecting a substantial change in price.

It will be appreciated, however, that the disclosed embodiments may be applied to any spread contract having highly liquid leg component where it is desired to allow traders to keep the bid/ask spread, i.e., the difference in price between the highest price that a buyer is willing to pay (bid) and the lowest price for which a seller is willing to sell (ask), close, i.e. "tight," without artificially created orders, i.e. implied orders, crowding the traders' outright orders and/or where the bid/ask spread is already close, as is the case for highly liquid contracts, obviating the need for implied orders to improve liquidity.

Figure 3:
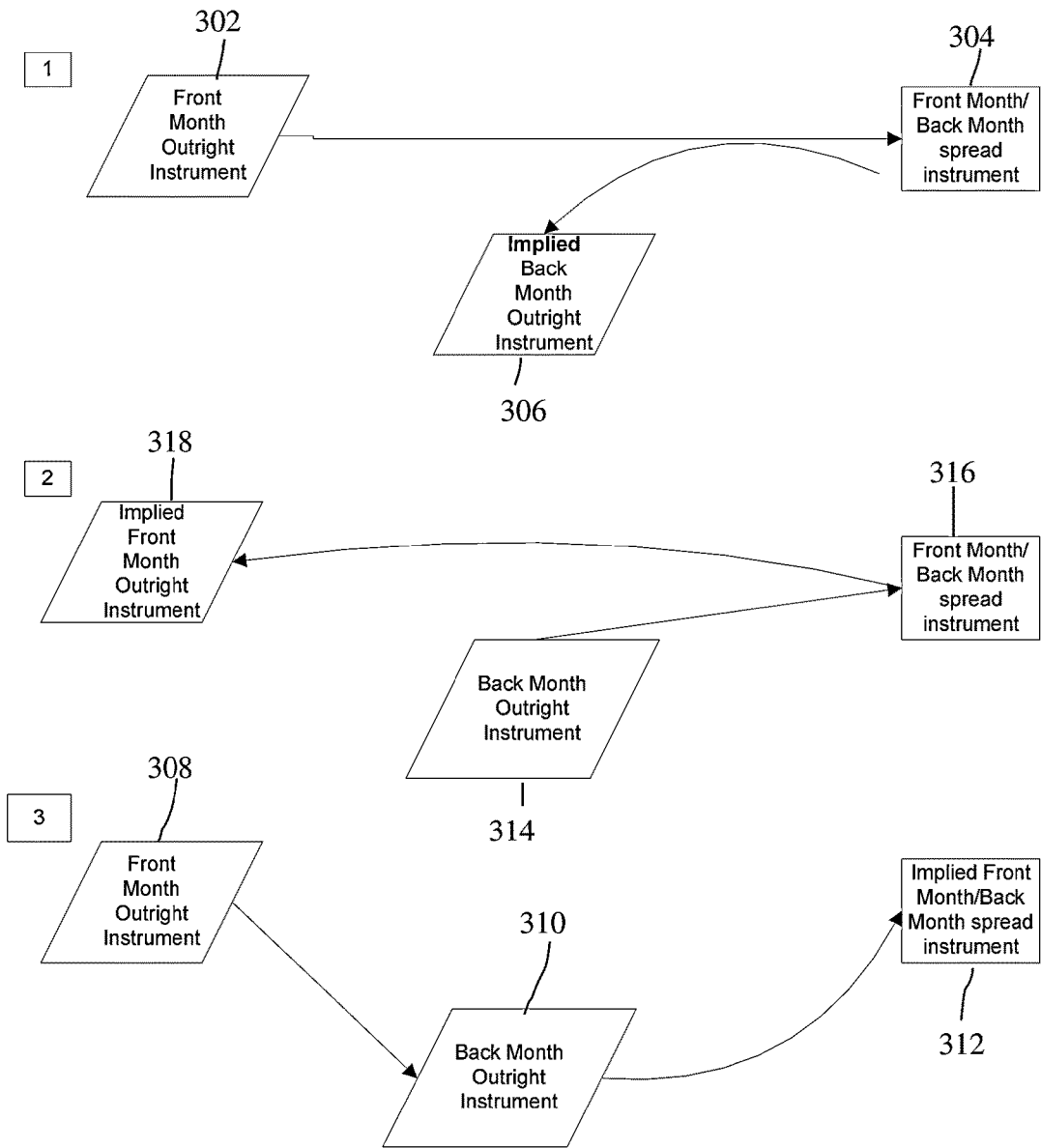
FIG. 3 depict examples of trading scenarios which may result in the generation of an implied order.

As shown in FIG. 3, with respect to calendar spreads, the disclosed embodiments allow the Match Engine 104 to compute implied orders for outright orders placed for a front-month contract 302 in combination with a spread between the front-month and a back-month contract 304, i.e. implying the order in the back-month contract 306, or for outright orders for the front-month contract 308 and the back-month contract 310, i.e. implying the order for the spread there between 312. However, in the case of an outright order for a back-month contract 314 in combination with an order for a spread between the front-month contract and the back-month contract 316, the disclosed embodiments suppress or otherwise prevent the computation of the implied front-month contract order 318 and the subsequent listing thereof.

The disclosed embodiments allow, for example, arbitrageurs, i.e., traders which attempt to profit from price differentials, to keep the front month bid/ask spread very close together, i.e. 'tight', without the Match Engine 104 artificially creating implied orders into the front month contract, and allow them to profit from other participants entering market orders into the front month contract. This is because another trader is more likely to enter a counter-order at a price which is better or otherwise more optimal for arbitrageur trader than the automatically generated implied order. In addition, front month contracts are by definition the most liquid contract month, as opposed to other month contracts, and are very tight, usually displaying a 1 tick bid/ask spread. Therefore, implieds may not be necessary for inclusion into the order books of front month contracts as they would not further improve liquidity. Accordingly, the disclosed embodiments may also improve the efficiency of the trading system 100 by reducing the number of implied orders which must be calculated, listed, and managed, thereby minimizing the calculations that the trading system 100 must undertake and reduces the messages that are transmitted via market data.

It will be appreciated that for the purpose of keeping a particular bid/ask spread close, once calculated, an implied order may simply be prevented from being listed. While not necessarily reducing the computation load on the trading system 100, such an implementation would also improve system 100 efficiency by reducing message traffic as well as minimizing resources consumed due to listing and managing the implied orders.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 4:
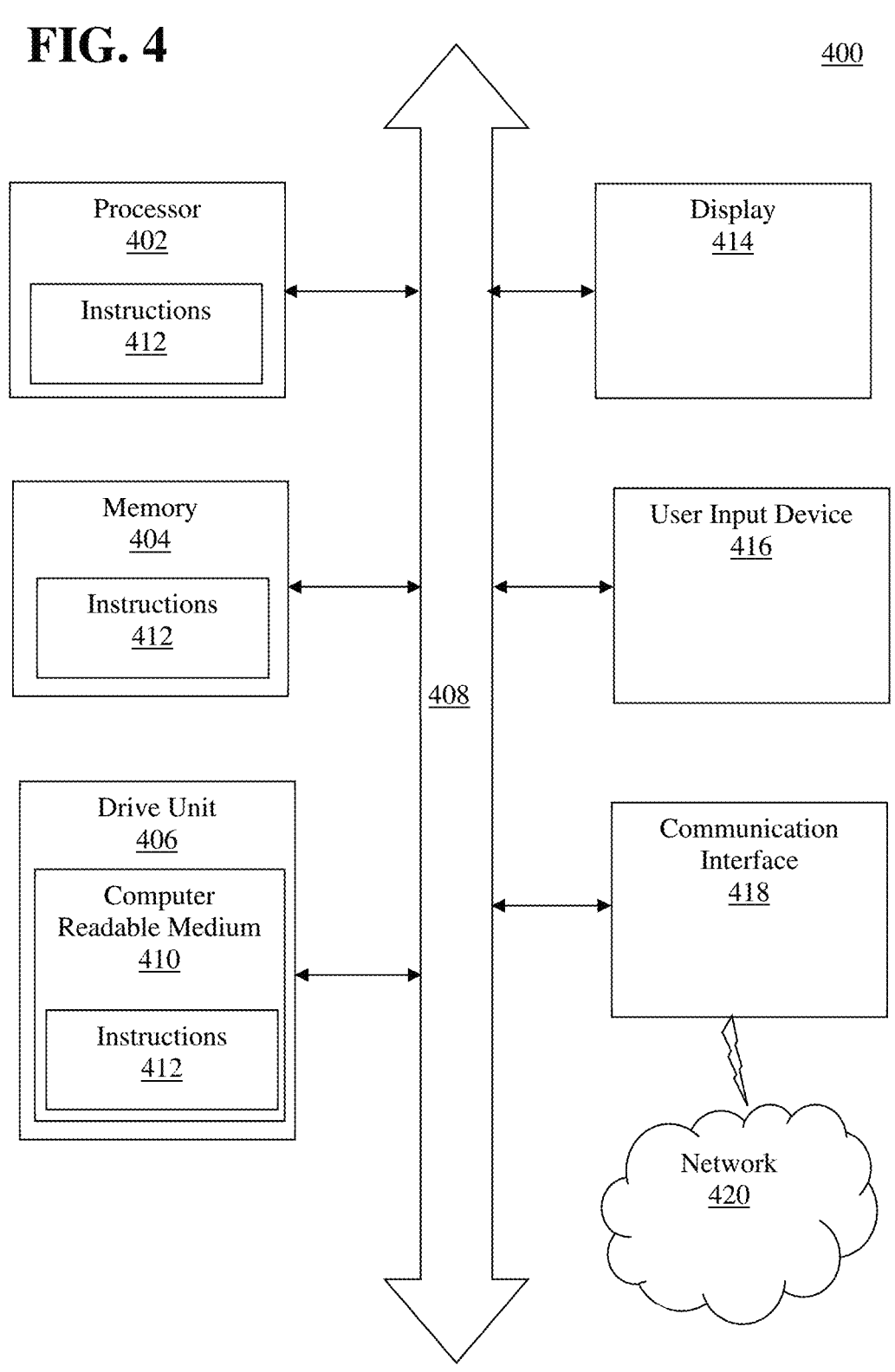
FIG. 4 shows an illustrative embodiment of a general computer system for use with the system of FIG. 1.
Figure 5:
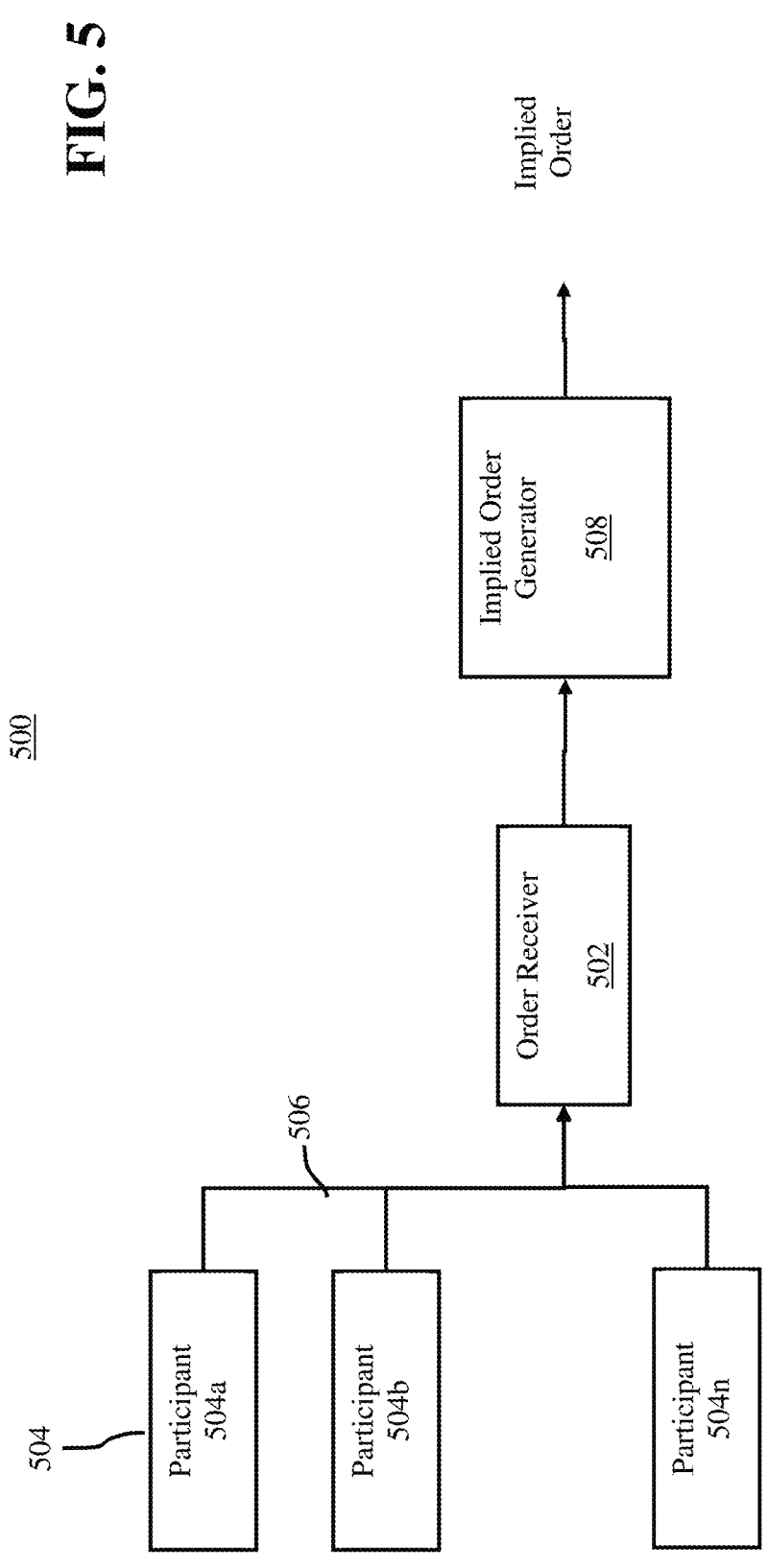
FIG. 5 is a block diagram depicting one embodiment of a system for improving the efficiency of a trading system.

Referring now to FIG. 5, there is shown a block diagram depicting one embodiment of a system 500 for improving the efficiency of a trading system 100. The system 500, which may include a processor and a memory coupled therewith, such as the processor 402 and memory 404 described below with respect to FIG. 4, includes an order receiver 502, which may be implemented as logic stored in the memory 404 and executable by the processor 402, operative to receive, such as via a network 506 which may be the network 420, described below, from at least one market participant 504*a* of a plurality of market participants 504*a-n*, a first order for a first instrument and a second order for a second instrument, the first and second orders having a relationship there between from which at least a third order for a third instrument may be implied. It will be appreciated that both the first and second order may be received from the same or from different participants 504*a-n*. The market participant 504 may be using the client 109 coupled with the trading system 100 via the network 101 with the order submission point 102 as described above. In one embodiment, the first and second orders may be the legs of a spread or one component, i.e. leg, and the spread itself, as was described above, where the relationship implies, in the case of the first and second orders being the spread legs, the spread itself or where the first and second orders are for one spread leg and the spread itself, the relationship implying at least the other spread leg. In one embodiment, the spread is a calendar spread with one leg being a front-month contract and the other leg being a back-month contract. It will be appreciated, however, that the disclosed embodiments may be implied in any situation, e.g., of any combination of orders, which imply at least one other order, including inter-commodity, intra-commodity, inter-market, and intra-market spreads.

The system 500 further includes an implied order generator 508 coupled with order receiver 502 and operative to selectively generate the implied third order based on the first and second orders and make the computed implied third order available in a market for the third instrument for trading by the plurality of market participants 504*a-n*, such as be listing it on an order book for the third instrument.

The implied order generator 508 may be further operative to prevent, at least, the availability of the implied third order, such as by preventing it from being listed in the order book for the third instrument, when the market for the third instrument is determined to be substantially liquid. Further, in one embodiment, the implied order generator 508 may be further operative to prevent, or otherwise avoid, the generation of the implied third order when the market for the third instrument is determined to be substantially liquid.

In one embodiment, the first and second orders may each include component instruments of a spread order and the third order comprising the spread order. Alternatively, or in addition thereto, the first order may include a first component instrument of a spread order, the spread order being based on, or otherwise having, first and second component instruments, the second order comprises the spread order and the third order comprises the second component instrument of the spread order. Alternatively, or in addition thereto, the first order may include an order for a back-month contract and the second order comprises an order for a spread between the back-month contract and a front-month contract, the third order comprising an order for the front-month contract. The market for the third instrument may be characterized by a best ask price and a best bid price within 1 price tick thereof.

It will be appreciated that liquidity of a market is implementation dependent and/or may depend upon the perspective of one or more participants of the 504*a-n*. Generally, market liquidity may be defined as an asset's ability to be bought or sold without causing a significant movement in the price and with minimum loss of value, e.g. where there are ready and willing buyers and sellers at all times, such as a market with many bid and ask orders, whereby the best bid and best offer prices are "relatively" close to one another. For example, liquidity of a market may be measured as the probability that the next trade in that market will be executed at a price equal to the most recent concluded trade in that market. Objectively, liquidity of a market may be measured by the difference in price tick value between the best bid price and the best ask price, such as where the difference is within a defined threshold value such as two price ticks. It will be appreciated that such a threshold may be specified as a fixed value or may be dynamically specified and vary based on, for example, time of day, day of month, month of year, order volume, current price level of the best ask and/or best bid prices, instrument type, a parameter of a correlated market, or other parameter or combination thereof. In known markets, liquidity may be defined specifically based on the contract type, delivery month(s), commodity type, etc., such as, for example, where a market for a instrument deliverable in December is considered liquid as opposed to any other month. Alternatively, for example, a market for an instrument deliverable in the current month is considered liquid.

Accordingly, in one embodiment, the market for the third instrument may be determined to be substantially liquid when the best bid price in the market for the third instrument is within a statically or dynamically defined threshold number of price ticks of the best ask price in the market for the third instrument. For example, the threshold may be two price ticks. Alternatively, or in addition thereto, the market for the third instrument may be determined to be substantially liquid when a delivery month of the third instrument is one or more defined delivery months, e.g. December, or a defined range of months, the market for the third instrument may be determined to be substantially liquid when a delivery month for the third instrument is the current month, the market for the third instrument may be determined to be substantially liquid when a likelihood of receipt of an order, at a better price with respect to a resting counter order thereto, for the third instrument satisfying the relationship between the first and second orders from one of the plurality of market participants exceeds a threshold probability such as 50%, the market for the third instrument may be determined to be substantially liquid when the implied third order will not substantially improve, e.g. reduce, a spread between a best bid price and a best ask price in the market for the third instrument, such as not reduce it by more than 1 price tick.

It will be recognized that in some circumstances, suppression of an implied order may result in the relevant market becoming crossed, i.e., where there is listed a bid order at a higher price than a listed ask order. In a normal market, such as a situation does not occur as the trading or match engine will match the bid and offer to create a trade, e.g., market forces and economic motivations of the partici- pants 504*a-n* ensure that one will not buy something for more than is required. Accordingly, in one embodiment, the implied order generator 508 is further operative to determine whether prevention of the availability of the implied third order will result in the market for the third instrument being crossed and allow the availability of the implied third order if the prevention thereof will result in the market for the third instrument being crossed. This determination may be made before or after the implied order is generated depending upon the implementation.

Figure 6:
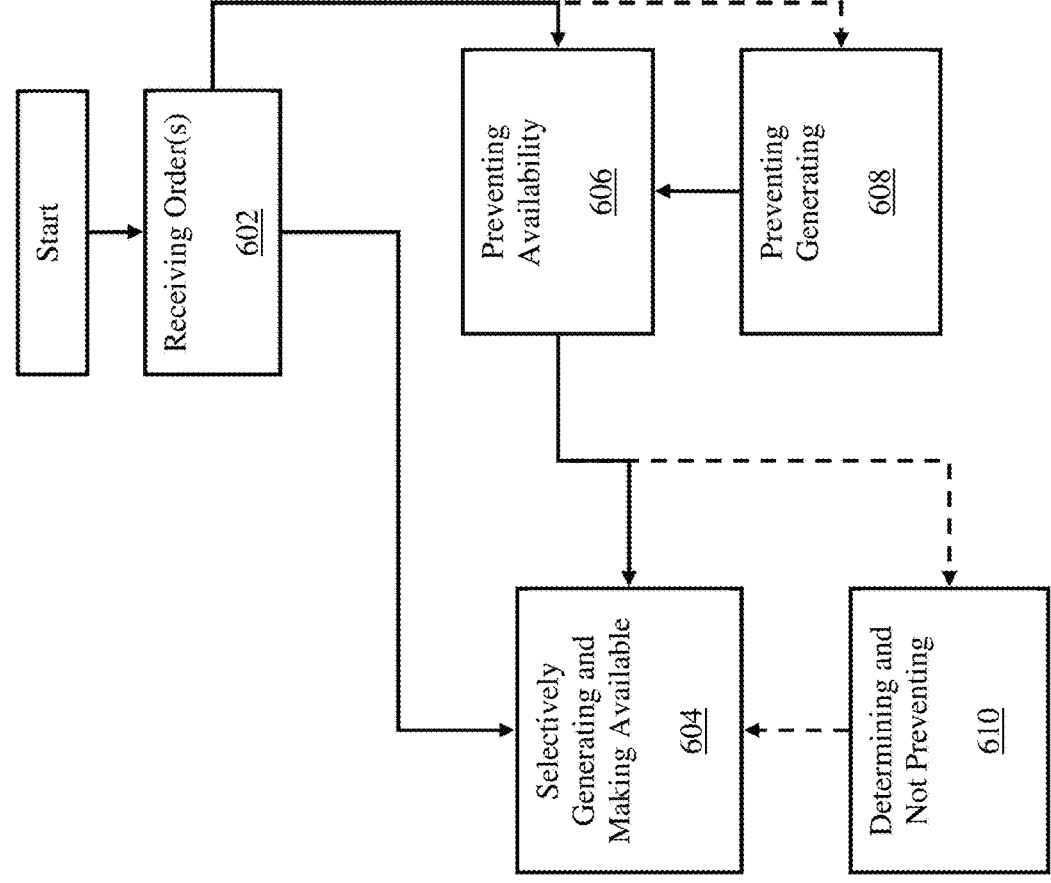
FIG. 6 is a flow chart depicting operation of the system of FIG. 5 for improving the efficiency of a trading system according to one embodiment.

Referring to FIG. 6, there is shown a flow chart depicting operation of the system 500, according to one embodiment, for improving the efficiency of a trading system 100. The operation includes receiving, by a processor, such as the processor 402, from at least one market participant 504*a* of a plurality of market participants 504*a-n*, a first order for a first instrument and a second order for a second instrument, the first and second orders having a relationship there between from which at least a third order for a third instrument may be implied (block 602). It will be appreci- ated that both the first and second order may be received from the same or from different participants 504*a-n*. The market participant 504 may be using the client 109 coupled with the trading system 100 via the network 101 with the order submission point 102 as described above. In one embodiment, the first and second orders may be the legs of a spread or one component, i.e. leg, and the spread itself, as was described above, where the relationship implies, in the case of the first and second orders being the spread legs, the spread itself or where the first and second orders are for one spread leg and the spread itself, the relationship implying at least the other spread leg. In one embodiment, the spread is a calendar spread with one leg being a front-month contract and the other leg being a back-month contract. It will be appreciated, however, that the disclosed embodiments may be implied in any situation, e.g., of any combination of orders, which imply at least one other order, including inter-commodity, intra-commodity, inter-market, and intra- market spreads.

The operation also includes selectively generating, by the processor 402, the implied third order based on the first and second orders and making the computed implied third order available in a market for the third instrument for trading by the plurality of market participants (block 604). The opera- tion of the system 500 further includes preventing by the processor 402, at least, the making available of the implied third order when the market for the third instrument is determined to be substantially liquid (block 606). Further, in one embodiment, the operation may include preventing, or otherwise avoiding, the generating of the implied third order when the market for the third instrument is determined to be substantially liquid (block 608).

In one embodiment, the first and second orders may each include component instruments of a spread order and the third order comprising the spread order. Alternatively, or in addition thereto, the first order may include a first compo- nent instrument of a spread order, the spread order being based on, or otherwise having, first and second component instruments, the second order comprises the spread order and the third order comprises the second component instru- ment of the spread order. Alternatively, or in addition thereto, the first order may include an order for a back-month contract and the second order comprises an order for a spread between the back-month contract and a front-month contract, the third order comprising an order for the front- month contract. The market for the third instrument may be characterized by a best ask price and a best bid price within 1 price tick thereof.

It will be appreciated that liquidity of a market is imple- mentation dependent and/or may depend upon the perspec- tive of one or more participants of the 504*a-n*. Generally, market liquidity may be defined as an asset's ability to be bought or sold without causing a significant movement in the price and with minimum loss of value, e.g. where there are ready and willing buyers and sellers at all times, such as a market with many bid and ask orders, whereby the best bid and best offer prices are "relatively" close to one another. For example, liquidity of a market may be measured as the probability that the next trade in that market will be executed at a price equal to the most recent concluded trade in that market. Objectively, liquidity of a market may be measured by the difference in price tick value between the best bid price and the best ask price, such as where the difference is within a defined threshold value such as two price ticks. It will be appreciated that such a threshold may be specified as a fixed value or may be dynamically specified and vary based on, for example, time of day, day of month, month of year, order volume, current price level of the best ask and/or best bid prices, instrument type, a parameter of a correlated market, or other parameter or combination thereof. In known markets, liquidity may be defined specifically based on the contract type, delivery month(s), commodity type, etc., such as, for example, where a market for a instrument deliverable in December is considered liquid as opposed to any other month. Alternatively, for example, a market for an instru- ment deliverable in the current month is considered liquid.

Accordingly, in one embodiment, the market for the third instrument may be determined to be substantially liquid when the best bid price in the market for the third instrument is within a statically or dynamically defined threshold num- ber of price ticks of the best ask price in the market for the third instrument. For example, the threshold may be two price ticks. Alternatively, or in addition thereto, the market for the third instrument may be determined to be substan- tially liquid when a delivery month of the third instrument is one or more defined delivery months, e.g. December, or a defined range of months, the market for the third instru- ment may be determined to be substantially liquid when a delivery month for the third instrument is the current month, the market for the third instrument may be determined to be substantially liquid when a likelihood of receipt of an order, at a better price with respect to a resting counter order thereto, for the third instrument satisfying the relationship between the first and second orders from one of the plurality of market participants exceeds a threshold probability such as 50%, the market for the third instrument may be deter- mined to be substantially liquid when the implied third order will not substantially improve, e.g. reduce, a spread between a best bid price and a best ask price in the market for the third instrument, such as not reduce it by more than 1 price tick.

As discussed above, in one embodiment, so as to avoid a crossed market, the operation of the system 500 may further include determining whether preventing the making avail- able of the implied third order will result in the market for the third instrument being crossed and not preventing the making available of the implied third order if the preventing the making available of the implied third order will result in the market for the third instrument being crossed (block 610).

Referring to FIG. 4, an illustrative embodiment of a general computer system 400 is shown. The computer system 400 can include a set of instructions that can be executed to cause the computer system 400 to perform any one or more of the methods or computer-based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g., software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images, or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   receiving, by an order receiver processor, via a communications network, from at least one market participant of a plurality of market participants, a first order for at least a first instrument, the first order having a relationship with another order from which at least a second order for a second instrument may be implied; and
   calculating, by an implied order generator processor coupled with the order receiver processor, prior to generation the implied second order, a current binary liquidity value of the second instrument using the first order, the current binary liquidity value varying as a function of time between being one of liquid or illiquid, and, based thereon, preventing generation, by the implied order generator processor, of the implied second order and thereby preventing, by the implied order generator processor, subsequently listing the implied second order in response to the calculated current binary liquidity value being liquid, and allowing generation and listing, by the implied order generator processor, of the implied second order in response to the calculated current binary liquidity value of the second instrument being illiquid.

2. The computer implemented method of claim 1, further comprising:

receiving, by the order receiver processor, from at least another market participant from the plurality of market participants, a third order for at least a third instrument, the third order having a relationship with yet another order from which at least a fourth order for a fourth instrument may be implied;

calculating, by the implied order generator processor, prior to generation of the implied fourth order and using the third order, a current binary liquidity value of the fourth instrument as being illiquid;

generating, by the implied order generator processor, the implied fourth order from the third order in response to the calculated current binary liquidity value of the fourth instrument being illiquid; and subsequent to the implied fourth order being generated, listing, by the implied order generator processor, the generated implied fourth order and making the generated implied fourth order available in a market for the fourth instrument for trading.

3. The computer implemented method of claim 2, wherein the first order comprises one or more component instruments of a spread order, and the second order comprises the spread order, and wherein the third order comprises one or more component instruments of another spread order, and the fourth order comprises the other spread order.

4. The computer implemented method of claim 2, wherein the first order comprises an order for a back-month contract and an order for a spread between the back-month contract and a front-month contract, the second order comprising an order for the front-month contract, and wherein the third order comprises another order for the back-month contract and another order for another spread between the back-month contract and the front-month contract, the fourth order comprising another order for the front-month contract.

5. The computer implemented method of claim 2, wherein the market for the second instrument is characterized by a best ask price and a best bid price within 1 price tick thereof, wherein the market for the fourth instrument is characterized by another best ask price and another best bid price within 1 price tick thereof.

6. The computer implemented method of claim 2, further comprising:

calculating the current binary liquidity value of the second instrument based on how many price ticks that a best bid price in the market for the second instrument is within a best ask price in the market for the second instrument, a delivery month of the second instrument, a likelihood of receiving an order, at a better price with respect to a resting counter order thereto, for the second instrument satisfying the relationship between the first order and the other order from one of the plurality of market participants, and/or whether the implied second order will not improve a spread between a best bid price and a best ask price in the market for the second instrument; and calculating the current binary liquidity value of the fourth instrument based on how many price ticks that a best bid price in the market for the fourth instrument is within a best ask price in the market for the fourth instrument, a delivery month of the fourth instrument, a likelihood of receiving an order, at a better price with respect to a resting counter order thereto, for the fourth instrument satisfying the relationship between the third order and the other order from one of the plurality of market participants, and/or whether the implied fourth order will not improve a spread between a best bid price and a best ask price in the market for the fourth instrument.

7. The computer implemented method of claim 6, wherein the calculated current binary liquidity value of the second instrument is liquid when the best bid price in the market for the second instrument is within a threshold number of price ticks of the best ask price in the market for the second instrument, when the delivery month of the second instrument is a defined delivery month, when the delivery month for the second instrument is the current month, when the likelihood of receiving an order, at a better price with respect to a resting counter order thereto, for the second instrument satisfying the relationship between the first order and the other order from one of the plurality of market participants exceeds a threshold, and/or when the implied second order will not improve a spread between the best bid price and the best ask price in the market for the second instrument, and wherein the calculated current binary liquidity value of the fourth instrument is illiquid when the best bid price in the market for the fourth instrument is not within a threshold number of price ticks of the best ask price in the market for the fourth instrument, when the delivery month of the fourth instrument is not the defined delivery month, when the delivery month for the fourth instrument is not the current month, when the likelihood of receiving an order, at a better price with respect to a resting counter order thereto, for the fourth instrument satisfying the relationship between the third order and the other order from one of the plurality of market participants does not exceed the threshold, and/or when the implied fourth order will improve the spread between the best bid price and the best ask price in the market for the fourth instrument.

8. The computer implemented method of claim 7, wherein the threshold comprises two price ticks.

9. The computer implemented method of claim 1, wherein not generating and preventing listing the implied second order further comprises:

determining, by the implied order generator processor, whether not generating and preventing listing the implied second order will result in the market for the second instrument being crossed; and generating and subsequently listing, by the implied order generator processor, the implied second order if the not generating and preventing listing the implied second order will result in the market for the second instrument being crossed.

10. A computer system comprising:

an order receiver processor specifically configured to receive, from at least one market participant from a plurality of market participants, via a communications network, a first order for at least a first instrument, the first order having a relationship with another order from which at least a second order for a second instrument may be implied; and an implied order generator processor coupled with the order receiver processor, the implied order generator processor specifically configured to:

calculate, prior to generation of the implied second order, a current binary liquidity value of the second instrument using the first order, the current binary liquidity value varying as a function of time between being one of liquid or illiquid, and based thereon, prevent generation of the implied second order and thereby prevent subsequently listing the implied second order in response to the calculated current binary liquidity value of the second instrument being liquid, and allow generation and listing of the implied second order in response to the calculated current binary liquidity value of the second instrument being illiquid.

11. The computer system of claim 10, wherein the order receiver processor is further specifically configured to receive, from at least another one market participant from the plurality of market participants, via the communications network, a third order for at least a third instrument, the third order having a relationship with yet another order from which at least a fourth order for a fourth instrument may be implied;

wherein the implied order generator processor is further specifically configured to:

calculate, prior to generation of the implied fourth order and using the third order, a current binary liquidity value of the fourth instrument as being illiquid;

generate, the implied fourth order from the third order in response to the calculated current binary liquidity value of the fourth instrument being illiquid; and subsequent to the implied fourth order being generated, list the generated implied fourth order and make the generated implied fourth order available in a market for the fourth instrument for trading.

12. The computer system of claim 11, wherein the first order comprises one or more component instruments of a spread order and the second order comprises the spread order, and wherein the third order comprises one or more component instruments of another spread order and the fourth order comprises the other spread order.

13. The computer system of claim 11, wherein the first order comprises an order for a back-month contract and an order for a spread between the back-month contract and a front-month contract, the second order comprising an order for the front-month contract, and wherein the third order comprises another order for the back-month contract and another order for another spread between the back-month contract and the front-month contract, the fourth order comprising another order for the front-month contract.

14. The computer system of claim 11, wherein the market for the second instrument is characterized by a best ask price and a best bid price within 1 price tick thereof, and wherein the market for the fourth instrument is characterized by another best ask price and another best bid price within 1 price tick thereof.

15. The computer system of claim 11, wherein the current binary liquidity value of the second instrument is calculated based on how many price ticks that a best bid price in the market for the second instrument is within a best ask price in the market for the second instrument, a delivery month of the second instrument, a likelihood of receiving an order, at a better price with respect to a resting counter order thereto, for the second instrument satisfying the relationship between the first order and the other order from one of the plurality of market participants, and/or whether the implied second order will not improve a spread between a best bid price and a best ask price in the market for the second instrument, and wherein the current binary liquidity value of the fourth instrument is calculated based on how many price ticks that a best bid price in the market for the fourth instrument is within a best ask price in the market for the fourth instrument, a delivery month of the fourth instrument, a likelihood of receiving an order, at a better price with respect to a resting counter order thereto, for the fourth instrument satisfying the relationship between the third order and the other order from one of the plurality of market participants, and/or whether the implied fourth order will not improve a spread between a best bid price and a best ask price in the market for the fourth instrument.

16. The computer system of claim 15, wherein the calculated current binary liquidity value of the second instrument is liquid when the best bid price in the market for the second instrument is within a threshold number of price ticks of the best ask price in the market for the second instrument, when the delivery month of the second instrument is a defined delivery month, when the delivery month for the second instrument is a current month, when the likelihood of receiving an order, at a better price with respect to a resting counter order thereto, for the second instrument satisfying the relationship between the first order and the other order from one of the plurality of market participants exceeds a threshold, and/or when the implied second order will not improve a spread between the best bid price and the best ask price in the market for the second instrument, and wherein the calculated current binary liquidity value of the fourth instrument is illiquid when the best bid price in the market for the fourth instrument is not within a threshold number of price ticks of the best ask price in the market for the fourth instrument, when the delivery month of the fourth instrument is not the defined delivery month, when the delivery month for the fourth instrument is not the current month, when a likelihood of receiving an order, at a better price with respect to a resting counter order thereto, for the fourth instrument satisfying the relationship between the third order and the other order from one of the plurality of market participants does not exceed the threshold, and/or when the implied fourth order will improve the spread between the best bid price and the best ask price in the market for the fourth instrument.

17. The computer system of claim 16, wherein the threshold comprises two price ticks.

18. The computer system of claim 10, wherein the implied order generator processor is further specifically configured to:

determine whether not generating and preventing listing the implied second order will result in the market for the second instrument being crossed; and generate and subsequently list the implied second order if not generating and preventing listing the implied second order will result in the market for the second instrument being crossed.

19. A computer system comprising:

means for receiving a first order for at least a first instrument, the first order having a relationship with another order from which at least a second order for a second instrument may be implied; and means for calculating, prior to generation of the implied second order, a current binary liquidity value of the second instrument using the first order, the current binary liquidity value varying as a function of time between being one of liquid or illiquid, and based thereon, preventing generation of the implied second order and thereby preventing subsequently listing the implied second order in response to the calculated current binary liquidity value being liquid, and allowing generation and listing of the implied second order in response to the calculated current binary liquidity value of the second instrument being illiquid.

20. The computer system of claim 19, further comprising:

means for receiving a third order for at least a third instrument, the third order having a relationship with yet another order from which at least a fourth order for a fourth instrument may be implied;

means for calculating, prior to generation of the implied fourth order and using the third order, the current binary liquidity value of the fourth instrument as being illiquid;

means for generating the implied fourth order from the third order in response to the calculated current binary liquidity value of the fourth instrument being illiquid; and means for listing, subsequent to the implied fourth order being generated, the generated implied fourth order and making the generated implied fourth order available in a market for the fourth instrument for trading.

* * * * *